(12) United States Patent
Karczewicz et al.

(10) Patent No.: US 11,973,983 B2
(45) Date of Patent: Apr. 30, 2024

(54) SIGNALING CODING SCHEME FOR RESIDUAL VALUES IN TRANSFORM SKIP FOR VIDEO CODING

(71) Applicant: QUALCOMM Incorporated, San Diego, CA (US)

(72) Inventors: Marta Karczewicz, San Diego, CA (US); Muhammed Zeyd Coban, Carlsbad, CA (US); Alican Nalci, San Diego, CA (US); Hilmi Enes Egilmez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/066,308

(22) Filed: Oct. 8, 2020

(65) Prior Publication Data

US 2021/0112279 A1 Apr. 15, 2021

Related U.S. Application Data

(60) Provisional application No. 62/914,315, filed on Oct. 11, 2019.

(51) Int. Cl.
*H04N 19/61* (2014.01)
*H04N 19/103* (2014.01)
(Continued)

(52) U.S. Cl.
CPC ........... *H04N 19/61* (2014.11); *H04N 19/103* (2014.11); *H04N 19/124* (2014.11);
(Continued)

(58) Field of Classification Search
CPC .... H04N 19/61; H04N 19/103; H04N 19/124; H04N 19/176; H04N 19/46; H04N 19/70
See application file for complete search history.

(56) References Cited

U.S. PATENT DOCUMENTS 10,390,046 B2 * 8/2019 Joshi ....................... H04N 19/70
2012/0014449 A1 * 1/2012 Park ..................... H04N 19/174
375/E7.125

(Continued)

OTHER PUBLICATIONS

"AHG18: Residual coding selection signaling for lossless VVC" T-C MA et al., retrieved Oct. 6, 2019 (Year: 2019).*

(Continued)

*Primary Examiner* — Jonathan R Messmore
(74) *Attorney, Agent, or Firm* — Shumaker & Sieffert, PA

(57) ABSTRACT

An example method of decoding video data that includes receiving one or more syntax elements of the video data indicative of whether a first type of coding scheme or a second type of coding scheme is applied to residual values of a block of video data coded with transform skip, wherein the residual values are indicative of a difference between the block and a prediction block, and wherein, in transform skip, the residual values are not transformed from a sample domain to a frequency domain. The method includes determining a type of coding scheme to apply to the residual values based on the one or more syntax elements, determining the residual values based on the determined type of coding scheme, and reconstructing the block based on the determined residual values and the prediction block.

19 Claims, 6 Drawing Sheets

(51) Int. Cl.
  *H04N 19/124* (2014.01)
  *H04N 19/176* (2014.01)
  *H04N 19/46* (2014.01)
  *H04N 19/70* (2014.01)

(52) U.S. Cl.
  CPC .......... *H04N 19/176* (2014.11); *H04N 19/46* (2014.11); *H04N 19/70* (2014.11)

(56) References Cited

U.S. PATENT DOCUMENTS

| | | | | |
|---|---|---|---|---|
| 2015/0063446 | A1* | 3/2015 | Sugio | H04N 19/18 375/240.03 |
| 2019/0208203 | A1* | 7/2019 | Tsukuba | H04N 19/46 |
| 2021/0092388 | A1* | 3/2021 | Sarwer | H04N 19/189 |
| 2021/0400274 | A1* | 12/2021 | Yoo | H04N 19/18 |
| 2022/0078433 | A1* | 3/2022 | Yoo | H04N 19/70 |

OTHER PUBLICATIONS

"AHG18: Residual coding method for lossless mode", Sarwer et al., retrieved Oct. 4, 2019 (Year: 2019).*
"Test Model 6 of Versatile Video Coding(VTM 6)", Gothenburg, retrieved Oct. 7, 2019 (Year: 2019).*
"Lossless Coding and Loop Filter Control for Transform Skip", VanDerAuwera et al. retrieved Oct. 7, 2019 (Year: 2019).*
Bross B., et al., "AHG18: Enabling Lossless Coding with Minimal Impact on VVC Design", JVET-P0606-v1, Joint Video Experts Team (JVET) of ITU-T SG 16 WP 3 and ISO/IEC JTC 1/SC 29/WG 11, 16th Meeting, Geneva, CH, Oct. 1-11, 2019, 5 pages.
Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.
Bross B., et al., "Versatile Video Coding (Draft 6)", 127. MPEG and 15th JVET Meeting, Jul. 3, 2019-Jul. 12, 2019, Gothenburg, JVET-O2001-vE, Jul. 15, 2019, 455 Pages.
Bross B., et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019, 488 pages.
Chen J., et al., "Algorithm Description for Versatile Video Coding and Test Model 6 (VTM 6)", JVET-O2002-v2, Joint Video Experts Team (JVET) of ITU-T SG 16 WP 3 and ISO/IEC JTC 1/SC 29/WG 11, N18693, 15th Meeting, Gothenburg, SE, Jul. 3-12, 2019, XP30221926A, 88 pages.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.
International Search Report and Written Opinion—PCT/US2020/055013—ISA/EPO—dated Dec. 10, 2020 (20 pp).
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Ma T-C., et al., "AHG18: Residual Coding Selection Signaling for Lossless VVC", JVET-P0525, Joint Video Experts Team (JVET) of ITU-T SG 16 WP 3 and ISO/IEC JTC 1/SC 29/WG 11, 16th Meeting, Geneva, CH, Oct. 1-11, 2019, 6 pages.
Ma T-C., et al., "CE3-2.5: Residual Coding Selection Signaling for Lossless Coding", JVET-Q0070, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-4.
Nalci A., "CE3-2.3: Luma BDPCM for Lossless Coding using Regular Residual Coding", JVET-Q0088-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-3.
Nalci A., et al., "AHG18: BDPCM for Lossless", JVET-P0082-v9, Joint Video Experts Team (JVET) of ITU-T SG 16 WP 3 and ISO/IEC JTC 1/SC 29/WG 11, 16th Meeting, Geneva, CH, Oct. 1-11, 2019, 12 pages.
Nalci A., et al., "CE3-2.4: Luma and Chroma BDPCM for Lossless Coding with Regular Residual Coding", JVET-Q0089-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-3.
Sarwer M.G., et al., "AHG 18: Residual Coding Method for Lossless Mode", JVET-P0463-v3, Joint Video Experts Team (JVET) of ITU-T SG 16 WP 3 and ISO/IEC JTC 1/SC 29/WG 11, 16th Meeting, Geneva, CH, Oct. 1-11, 2019, 22 pages.
Suehring K., VTM Version 7.0, Oct. 2019, 2 pages.
Van der Auwera G., et al., "Lossless Coding and Loop Filter Control for Transform Skip", JCTVC-J0435, Joint Collaborative Team on Video Coding (JCT-VC) of ITU-T SG 16 WP 3 and ISO/IEC JTC 1/SC 29/WG 11, 10th Meeting, Stockholm, SE, Jul. 11-20, 2012, XP30235280A, pp. 1-8.

* cited by examiner

SIGNALING CODING SCHEME FOR RESIDUAL VALUES IN TRANSFORM SKIP FOR VIDEO CODING This application claims the benefit of U.S. Provisional Application No. 62/914,315, filed Oct. 11, 2019, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for lossless coding schemes and signaling for video coding. There may be at least two coding schemes used to code (e.g., encode or decode) residual values of video data. A first coding scheme is transform coefficient coding (TRCC), and a second coding scheme is transform skip residual coding (TSRC). In some cases, TSRC may be available only for a block of video data coded with transform skip (e.g., the residual values for the block are not transformed from sample domain to frequency domain). However, there may be benefits with using TRCC even for transform skipped blocks. This disclosure describes example techniques to utilize TRCC even for transform skipped blocks, and thereby improve the overall coding process.

In one example, this disclosure describes a method of decoding video data that includes receiving, from a video bitstream, one or more syntax elements of the video data indicative of whether a first type of coding scheme or a second type of coding scheme is applied to residual values of a block of video data coded with transform skip, wherein the residual values are indicative of a difference between the block and a prediction block, and wherein, in transform skip, the residual values are not transformed from a sample domain to a frequency domain; determining a type of coding scheme to apply to the residual values based on the one or more syntax elements; determining the residual values based on the determined type of coding scheme; and reconstructing the block based on the determined residual values and the prediction block.

In another example, this disclosure describes a method of encoding video data that includes determining residual values based on a difference between a block of video data that is to be coded with transform skip and a prediction block, wherein, in transform skip, the residual values are not transformed from a sample domain to a frequency domain; determining a type of coding scheme between a first type of coding scheme and a second type of coding scheme to apply to the residual values; encoding the residual values based on the determined type of coding scheme; and signaling, into a video bitstream, one or more syntax elements of the video data indicative of whether the first type of coding scheme or the second type of coding scheme is applied to the residual values.

In another example, this disclosure describes a device for decoding video data that includes memory configured to store video data; and processing circuitry coupled to the memory and configured to: receive, from a video bitstream, one or more syntax elements of the video data indicative of whether a first type of coding scheme or a second type of coding scheme is applied to residual values of a block of video data coded with transform skip, wherein the residual values are indicative of a difference between the block and a prediction block, and wherein, in transform skip, the residual values are not transformed from a sample domain to a frequency domain; determine a type of coding scheme to apply to the residual values based on the one or more syntax elements; determine the residual values based on the determined type of coding scheme; and reconstruct the block based on the determined residual values and the prediction block.

In another example, this disclosure describes a computer-readable storage medium having stored thereon instructions that, when executed, cause one or more processors to: receive, from a video bistream, one or more syntax elements of the video data indicative of whether a first type of coding scheme or a second type of coding scheme is applied to residual values of a block of video data coded with transform skip, wherein the residual values are indicative of a difference between the block and a prediction block, and wherein, in transform skip, the residual values are not transformed from a sample domain to a frequency domain; determine a type of coding scheme to apply to the residual values based on the one or more syntax elements; determine the residual values based on the determined type of coding scheme; and reconstruct the block based on the determined residual values and the prediction block.

In another example, this disclosure describes a device for decoding video data that includes means for receiving, from a video bitstream, one or more syntax elements of the video data indicative of whether a first type of coding scheme or a second type of coding scheme is applied to residual values of a block coded with transform skip, wherein the residual values are indicative of a difference between the block and a prediction block, and wherein, in transform skip, the residual values are not transformed from a sample domain to a frequency domain; means for determining a type of coding scheme to apply to the residual values based on the one or more syntax elements; means for determining the residual values based on the determined type of coding scheme; and means for reconstructing the block based on the determined residual values and the prediction block.

The details of one or more examples are set forth in the accompanying drawings and the description below. Other features, objects, and advantages will be apparent from the description, drawings, and claims.

DETAILED DESCRIPTION

Figure 1:
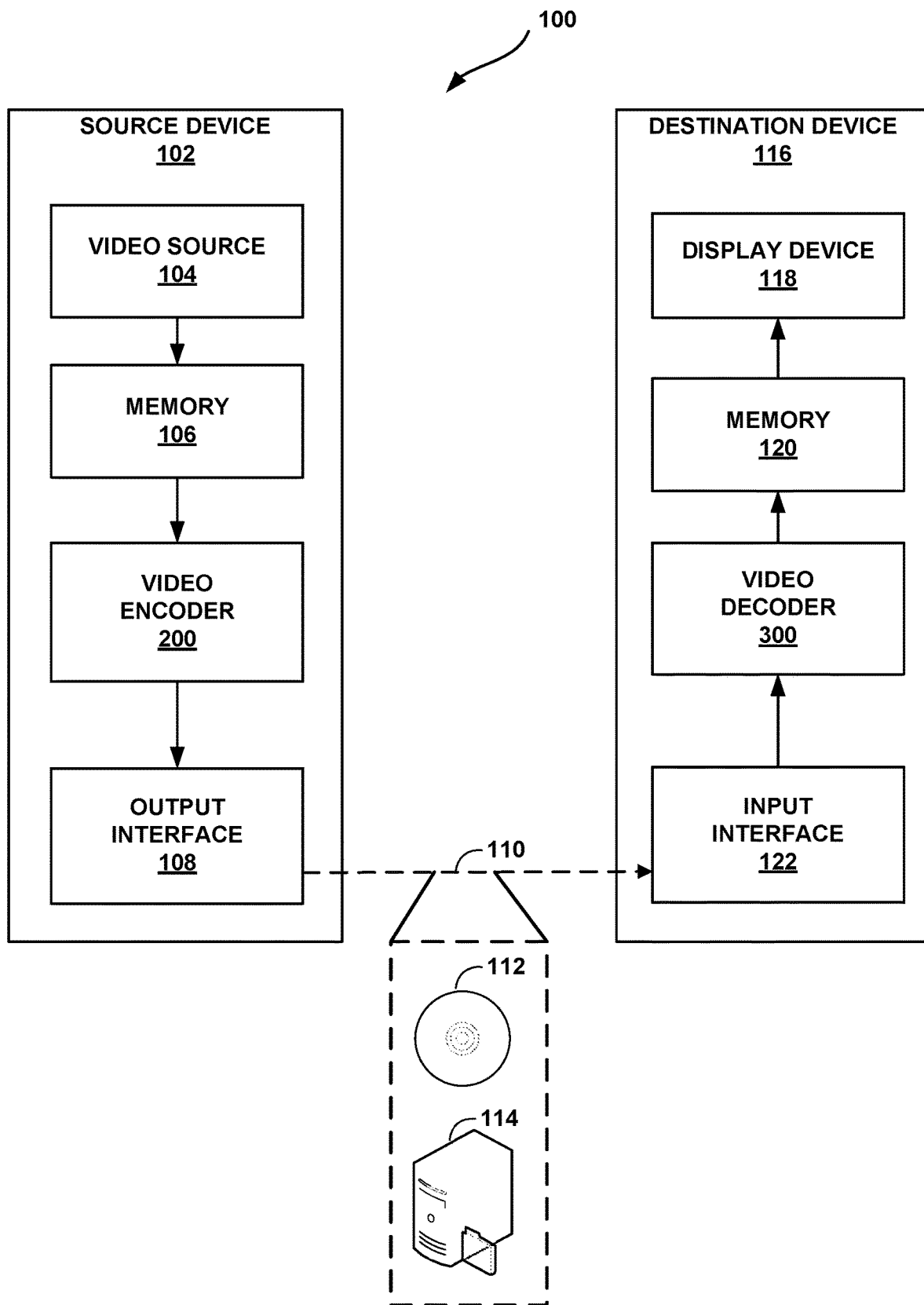
FIG. 1 is a block diagram illustrating an example video encoding and decoding system that may perform the techniques of this disclosure.

In video coding techniques, a video encoder determines residual information (e.g., residual values) indicative of a difference between samples of a current block and samples of a prediction block. In some cases, the video encoder transforms the sample values of the residual information (e.g., residual values) in the sample domain (also called pixel domain) to coefficient values in the frequency domain. In some examples, the coefficient values are then quantized, and entropy encoded into a bitstream. A video decoder receives the quantized coefficient values from the bitstream. The video decoder inverse-quantizes the coefficient values and inverse-transforms the inverse-quantized coefficient values to generate the residual values. The video decoder adds the residual values to the prediction block to reconstruct the current block.

In some cases, the transform and/or quantization can by lossy. For example, some of the residual values may be lost in the transform and/or quantization steps. Therefore, the residual values that the video decoder generates may not be identical to the residual values that the video encoder generates. Accordingly, in some cases, the current block reconstructed by the video decoder may not be identical to the original current block that the video encoder encoded.

Although there may be some loss in the encoding process, the current block reconstructed by the video decoder tends to be sufficiently the same as the original current block such that there is little to no reduction in visual quality. However, in some cases, it may be desirable to include lossless video coding tools such that there is little to no loss in the residual values (e.g., so that the residual values at the video encoder is more similar to the residual values at the video decoder as compared to lossy video coding techniques).

In some cases, for lossless video coding, the video encoder may skip the transform step for a particular block. The video encoder may signal information that indicates that transform was skipped for the particular block. The video decoder may determine that transform is skipped based on the signaled information. In some examples, the video decoder may implicitly determine whether transform for a block is skipped without the video encoder signaling information indicating that transform is skipped.

Regardless of whether transform is skipped or not, the residual values may be coded. There are two example schemes in which residual values can be coded: transform coefficient coding (TRCC) and transform skip (TS) residual coding (TSRC). In TRCC, the video encoder may determine coefficient values from the residual values (e.g., via transform) and entropy encode information used to determine the coefficient values. For example, the video encoder may determine information such as last significant coefficient value position, significance map (e.g., information indicative of which coefficient values are not zero), coefficient levels (e.g., information indicative of which coefficient values have absolute values that are greater than 1, greater than 2, and so forth), and sign data (e.g., whether a coefficient value is negative or positive).

TSRC may be different than TRCC. In TSRC, there may not be signaling of the position of the last significant coefficient. In TSRC, information such as a significance map, coefficient levels, and sign data may be similar to TRCC. However, the context modeling and binarization as well as a limit for the number of context coded bins per sample may be different for TSRC as compared to TRCC. The above are a few non-limiting examples of differences and similarities between TSRC and TRCC. There may be other differences and other similarities. Also, what are identified as differences between TSRC and TRCC may be the same in some cases, and what are identified as similarities between TSRC and TRCC may be different in some cases.

In some cases, TSRC may be exclusively used for residual coding of transform skipped blocks. However, there may be benefits to using TRCC for transform skipped blocks. This disclosure describes example techniques for ways in which TSRC or TRCC may be used where lossless coding techniques (e.g., transform skip) are implemented. In this way, the example techniques may improve the operation of the video encoder and video decoder by allowing for TRCC or TSRC to be applied for residual values, which in turn may result in better video coding.

As one example, the video decoder may receive, from a video bitstream, one or more syntax elements of the video data indicative of whether a first type of coding scheme (e.g., TRCC) or a second type of coding scheme (e.g., TSRC) is applied to residual values of a block coded with transform skip. As described, the residual values are indicative of a difference between the block and a prediction block, and in transform skip, the residual values are not transformed from the sample domain to the frequency domain (also called transform domain). In some examples, to receive the one or more syntax elements, the video decoder may receive a flag in a slice header indicating whether the first type of coding scheme or the second type of coding scheme is applied to the residual values of the blocks in the slice coded with transform skip.

The video decoder may determine a type of coding scheme to apply to the residual values based on the one or more syntax elements (e.g., determine whether to use TRCC or TSRC), and determine the residual values based on the determined type of coding scheme. For example, the video decoder may parse values such as the last significant value position, significance map (e.g., information indicative of which values are not zero), coefficient levels (e.g., information indicative of which values have absolute values that are greater than 1, greater than 2, and so forth), sign data (e.g., whether a value is negative or positive), and so forth based on whether TRCC or TSRC is utilized to determine the residual values. The video decoder may reconstruct the block based on the determined residual values and the prediction block (e.g., add the residual values to the prediction block to reconstruct the block).

The video encoder may determine residual values based on a difference between a block that is to be coded with transform skip and a prediction block. In transform skip, the residual values are not transformed from the sample domain to the frequency domain (e.g., transform domain).

The video encoder may determine a type of coding scheme between a first type of coding scheme (e.g., TRCC) and a second type of coding scheme (e.g., TSRC) to apply to the residual values, and encode the residual values based on the determined type of coding scheme. For example, the video encoder may signal values such as the last significant value position, significance map (e.g., information indicative of which values are not zero), coefficient levels (e.g., information indicative of which values have absolute values that are greater than 1, greater than 2, and so forth), sign data (e.g., whether a value is negative or positive), and so forth based on whether TRCC or TSRC is utilized to determine the residual values.

The video encoder may signal, into a video bitstream, one or more syntax elements of the video data indicative of whether the first type of coding scheme or the second type of coding scheme is applied to residual values. In some examples, to signal the one or more syntax elements, the video encoder may signal a flag in a slice header indicating whether the first type of coding scheme or the second type of coding scheme is applied to the residual values of the block coded with transform skip.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for lossless coding and signaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for lossless coding and signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling, into a video bitstream, information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 July 2019, JVET-02001-vE (hereinafter "VVC Draft 6"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 June-1 July 2020, JVET-52001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information (e.g., residual values), and other information. The prediction information indicates how the CU is to be predicted in order to form a prediction block for the CU. The residual information (i.e., residual values) generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In some examples, VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. In some examples, VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

In some examples, the transform of the residual data (e.g., residual values) may be skipped. For instance, where lossless video coding techniques are applied the transform may be skipped. In such examples, the block being encoded may be referred to as a transform skipped block, transform skip block, or a block coded with transform skip.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients.

For example, video encoder 200 may round an n-bit value down to an m-bit value during quantization, where n is greater than m. In some examples, to perform quantization, video encoder 200 may perform a bitwise right-shift of the value to be quantized. In some examples, the quantization step may be bypassed.

Following quantization, video encoder 200 may scan the transform coefficients (or residual sample values where transform is skipped), producing a one-dimensional vector from the two-dimensional matrix including the quantized transform coefficients or residual sample values where transform is skipped and quantization is skipped or residual quantized sample values where transform is skipped but quantization is performed. The scan of transform coefficients may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan.

After scanning the quantized transform coefficients to form the one-dimensional vector, video encoder 200 may entropy encode the one-dimensional vector, e.g., according to context-adaptive binary arithmetic coding (CABAC). In examples where transform and/or quantization is skipped, video encoder 200 may entropy encode the one-dimensional vector of the residual sample values or the residual quantized sample values. Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual values for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual values for blocks (e.g., CUs) of video data.

The residual values may be represented by, for example, quantized transform coefficients. Video decoder 300 may inverse quantize and inverse transform the quantized transform coefficients of a block to reproduce a residual block for the block. However, where transform and/or quantization are not applied by video encoder 200, video decoder 300 may bypass the inverse quantize and/or inverse transform steps. For instance, the decoded values may be the residual values without a need for inverse quantizing and/or inverse transforming. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to utilize different coding schemes for transform skipped blocks (i.e., for blocks coded with transform skip). For example, it may be desirable to support lossless coding in VVC without adding lossless specific tools. There may be at least two residual coding schemes. A first residual coding scheme is referred to as transform coefficient coding (TRCC), and a second residual coding scheme is referred to as transform skip (TS) residual coding (TSRC).

The TRCC and TSRC schemes may be different ways in which to represent the residual values. In both TRCC and TSRC, video encoder 200 may determine whether a residual value in a residual block is significant (e.g., absolute value is greater than 0), and determine whether the residual value is greater than a threshold value. For example, video encoder 200 may determine whether a residual value in the residual block is greater than 1, greater than 3, greater than 5, and so on. Video encoder 200 may signal a plurality of flags that video decoder 300 utilizes to determine the residual value.

For example, if video encoder 200 signaled a first flag indicating that the residual value is significant, and a second flag indicating that the residual value is greater than 1, but not a third flag indicating that the residual value is less than 2, then video decoder 300 may determine that the residual value is greater than 1 and less than 2.

However, there may be differences between TRCC and TSRC schemes. In TRCC, video encoder 200 may signal information indicative of a position of a last significant coefficient value, which video decoder 300 may utilize to determine that all values following the position of the last significant value are 0. However, in TSRC scheme, where transform is skipped, there may be no last significant value since it is possible for there to be a significant value in any location within a residual block, including the last location in the residual block.

As another example, in the TRCC scheme, a number of flags indicating whether a residual value of the residual values is greater than a threshold value is different than a number of flags indicating whether the residual value of the residual values is greater than the threshold value in the TSRC scheme. For example, the TRCC scheme may include a flag that indicates whether a residual value is greater than 3 and not include a flag that indicates whether a residual value is greater than 5. However, in the TSRC scheme, there may be a flag that indicates whether a residual value is greater than 5, a flag that indicates whether a residual value is greater than 7, and a flag that indicates whether a residual value is greater than 9.

As yet another example, in the TRCC scheme, the scan order of the residual block may be from last-to-first, i.e., from last residual value to first residual value. However, in the TSRC scheme, the scan order of the residual block may be from first-to-last residual value.

Hence, the TRCC scheme and the TSRC scheme are different types of coding schemes that are applied to residual values. As described in more detail, in some examples, video encoder 200 utilized the TSRC scheme for all blocks coded with transform skip, and the TRCC scheme was not available for blocks coded with transform skip. However, there may be benefits for allowing the TRCC scheme to be used for blocks coded with transform skip.

In such cases, video encoder 200 may signal information that video decoder 300 receives that indicates whether a first type of coding scheme (e.g., TRCC scheme) or a second type of coding scheme (e.g., TSRC scheme) is applied. Such signaling may only be present in cases where transform skip is enabled. For example, video decoder 300 may first determine whether transform skip is enabled, and parse a flag in a slice header indicating whether the first type of coding scheme or the second type of coding scheme is applied based on the transform skip being enabled. That is, if transform skip is enabled, then video decoder 300 may parse a flag in a slice header indicating whether the first type of coding scheme or the second type of coding scheme is applied. However, if transform skip is not enabled, then video decoder 300 may not parse a flag in a slice header indicating whether the first type of coding scheme or the second type of coding scheme is applied.

Lossless coding may require skipping of the transform operation (e.g., video encoder 200 bypasses transforming of residual values into the frequency domain with coefficient values and video decoder 300 bypasses the inverse transform operation because the residual values are already in the sample domain). In some examples, video encoder 200 may signal a TS coding flag indicating that transform is skipped for a block (e.g., for a transform skipped block). The TS coding flag may be signaled as part of the multiple transform selection (MTS) index. In some examples, rather than explicitly signaling a TS coding flag, video decoder 300 may implicitly determine that a block is a transform skipped block (e.g., block coded with transform skip) if block-based quantized residual domain delta pulse code modulation (BDPCM) mode is selected. In some examples, video encoder 200 and video decoder 300 may utilize TSRC as the residual coding scheme for transform skipped blocks.

In some examples, it may be desirable to use TRCC as well as BDPCM for transform skip blocks. If existing low-level signaling is to be used, then a flag in a SPS, PPS, picture header, or slice header can be used to indicate the residual coding technique to be used when transform is skipped. That is, video encoder 200 may signal and video decoder 300 may receive a flag in the slice header indicating whether the first type of coding scheme (e.g., TRCC) or the second type of coding scheme (e.g., TSRC) is applied to the residual values of the block coded with transform skip. In this way, there may not need to be a change in the TS coding path (e.g., where transform is bypassed) of VVC Draft 6 and TSRC or TRCC can be used. However, the techniques described in this disclosure may be utilized even where changes to the TS coding path are made.

This disclosure describes techniques to add one or more syntax elements (e.g., a flag) in SPS, PPS, Picture Header or Slice Header to select the coefficient (residual) coding technique (e.g., TRCC or TSRC) to be used when transform is skipped. The one or more syntax elements (e.g., flag) may indicate whether TSRC or TRCC is used for the TS blocks (e.g., blocks coded with transform skip). In some examples, the signaled method may take effect only if the quantization parameter (QP) of the transform skipped block is less than or equal to 4 (i.e., lossless).

For example, VVC Draft 10 includes the sh_ts_residual_coding_disabled_flag. The sh_ts_residual_coding_disabled_flag is signaled in the slice header, and is an example of the flag described in this disclosure to indicate whether TSRC or TRCC is used for blocks coded with transform skip. For example, if sh_ts_residual_coding_disabled_flag is true (e.g., a logic 1), it means that TSRC is disabled, and TRCC is used. If sh_ts_residual_coding_disabled_flag is false (e.g., a logic 0), it means that TSRC is not disabled and TSRC is used, and that TRCC is not used.

VVC Draft 10 defines sh_ts_residual_coding_disabled_flag as follows: sh_ts_residual_coding_disabled_flag equal to 1 specifies that the residual_coding( ) syntax structure is used to parse the residual samples of a transform skip block for the current slice. sh_ts_residual_coding_disabled_flag equal to 0 specifies that the residual_ts_coding( )syntax structure is used to parse the residual samples of a transform skip block for the current slice. When sh_ts_residual_coding_disabled_flag is not present, it is inferred to be equal to 0. In VVC Draft 10, residual_coding( )synatx structure refers to the TRCC scheme and residual_ts_coding( )syntax structure refers to the TSRC scheme.

As set forth in section 7.3.7 (Slice header syntax) of VVC Draft 10, the sh_ts_residual_coding_disabled_flag syntax element is signaled only if transform skip is enabled. For instance, in VVC Draft 10, video encoder 200 may signal sps_transform_skip_enabled_flag that indicates whether transform skip is enabled or not for a block. Video decoder 300 may receive the sps_transform_skip_enabled_flag and parse the sh_ts_residual_coding_disabled_flag only if sps_transform_skip_enabled_flag is true (e.g., only if transform skip is enabled).

Accordingly, in one or more examples, video decoder 300 may receive, from a video bistream, one or more syntax elements of the video data (e.g., sh_ts_residual_coding_disabled_flag) indicative of whether a first type of coding scheme (e.g., TRCC) or a second type of coding scheme (e.g., TSRC) is applied to residual values of a block coded with transform skip. The residual values are indicative of a difference between the block and a prediction block, and in transform skip, the residual values are not transformed from sample domain to frequency domain (e.g., DCT or DST operations are skipped). In some examples, video decoder 300 may receive the sh_ts_residual_coding_disabled_flag in a slice header.

In one or more examples, video decoder 300 may receive a first flag indicating whether transform skip is enabled (e.g., sps_transform_skip_enabled_flag). To receive the one or more syntax elements, video decoder 300 may parse a second flag (e.g., sh_ts_residual_coding_disabled_flag) in a slice header indicating whether the first type of coding scheme or the second type of coding scheme is applied based on the first flag indicating that transform skip is enabled. For instance, video decoder 300 may only parse the second flag (e.g., sh_ts_residual_coding_disabled_flag) if the first flag (e.g., sps_transform_skip_enabled_flag) is true. If the first flag is false, video decoder 300 may not parse the second flag.

Video decoder 300 may determine a type of coding scheme to apply to the residual values based on the one or more syntax elements. For example, video decoder 300 may determine to use TRCC if sh_ts_residual_coding_disabled_flag is true, and determine to use TSRC if sh_ts_residual_coding_disabled_flag is false.

Video decoder 300 may determine the residual values based on the determined type of coding scheme. Because the block is coded in transform skip, video decoder 300 may determine the residual values without applying an inverse transform to the residual values. For instance, the residual values are already in the sample domain, and therefore, no inverse transform to inverse transform from frequency domain to sample domain may be needed.

Video decoder 300 may reconstruct the block based on the determined residual values and the prediction block. For example, video decoder 300 may add the prediction block to the determined residual values to reconstruct the block.

In one or more examples, video encoder 200 may determine residual values based on a difference between a block that is to be coded with transform skip and a prediction block. As described, in transform skip, the residual values are not transformed from sample domain to frequency domain.

Video encoder 200 may determine a type of coding scheme between a first type of coding scheme (e.g. TRCC) and a second type of coding scheme (e.g., TSRC) to apply to the residual values. Video encoder 200 may encode the residual values based on the determined type of coding scheme, and signal, into a video bitstream, one or more syntax elements of the video data (e.g., sh_ts_residual_coding_disabled_flag in a slice header) indicative of whether the first type of coding scheme (e.g., TRCC) or the second type of coding scheme (e.g., TSRC) is applied to residual values.

In some examples, TSRC may be replaced with TRCC scheme that skips coding of the last nonzero position (i.e., a position of a last significant coefficient) (assuming the last nonzero coefficient position in the block to be the last position of the block). In addition, video encoder 200 and video decoder 300 may rotate (e.g., 180-degrees) the coefficients to be coded as in (HEVC Rext). In such examples, there may not be a need to signal the coding scheme to be used for the transform skip case. For instance, the existing signaling may be used to achieve lossless coding since transform skip path would use the TRCC scheme without signalling the last position and potentially rotating the block to be coded.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
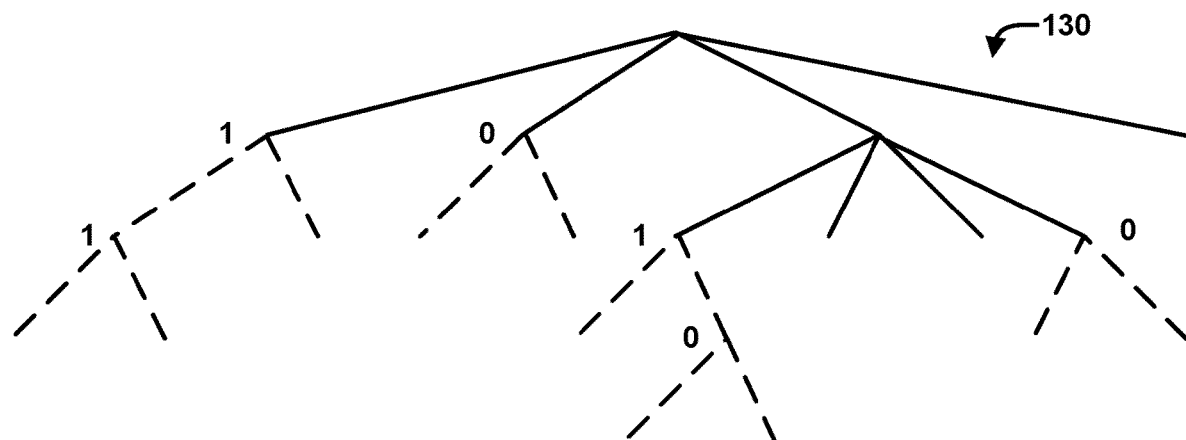
FIGS. 2A and 2B are conceptual diagrams illustrating an example quadtree binary tree (QTBT) structure, and a corresponding coding tree unit (CTU).
Figure 2B:
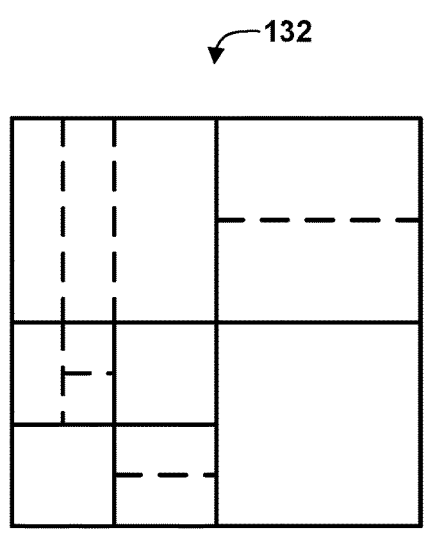

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
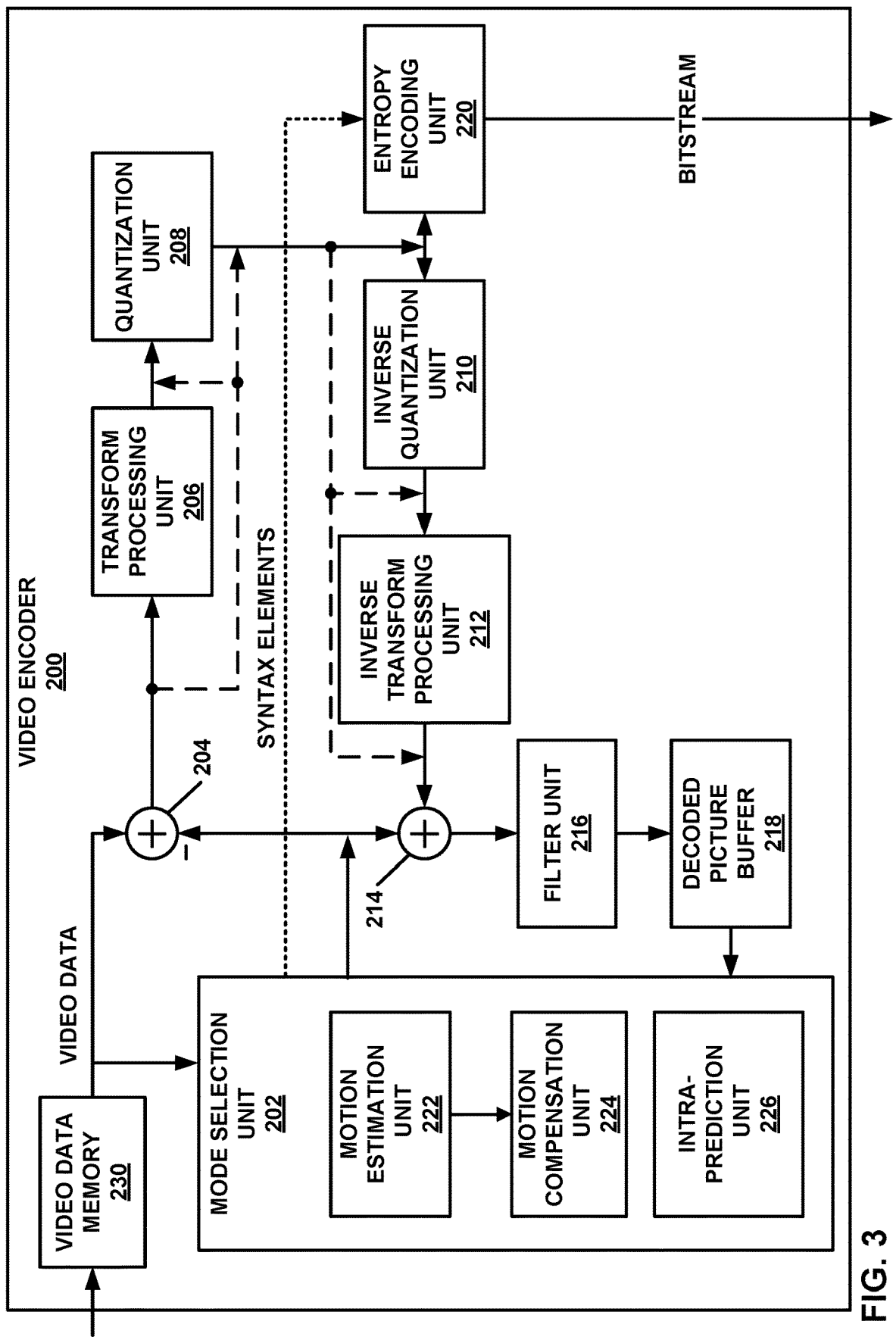
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the H.265 video coding standard (also called HEVC) and the H.266 video coding standard (also called VVC). However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

As illustrated in FIG. 3 with dashed lines, in some examples, one or both of transform processing unit 206 and quantization unit 208 may bypassed. For instance, mode selection unit 202 may determine that a block is to be encoded in transform skip mode. For a transform skipped block, the operations for transform processing unit 206 may be bypassed, and the operations for quantization unit 208 may be bypassed.

Inverse quantization unit 210 and inverse transform processing unit 212 may apply inverse quantization and inverse transforms to a quantized transform coefficient block, respectively, to reconstruct a residual block from the transform coefficient block. In examples where one or more transform and quantization is skipped, the operations of inverse quantization unit 210 and inverse transform processing unit 212 may be similarly skipped, as indicated by dashed lines.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In some examples, where transform is performed, entropy encoding unit 220 may be configured to use a first coding scheme referred to as transform coefficient coding (TRCC). Where transform is skipped, entropy encoding unit 220 may be configured to use a second coding scheme referred to as a transform skip residual coding (TSRC). However, in examples described in this disclosure, there may be times when TRCC is utilized even for a transform skipped block (e.g., where transform is skipped).

There may be various differences between TRCC and TSRC. As one example, in the TRCC scheme, information indicative of a position of a last significant value is signaled. In the TSRC scheme, information indicative of the position of the last significant value is not signaled. In the TRCC scheme, a number of flags indicating whether a residual value of the residual values is greater than a threshold value (e.g., greater than 1, greater than 3, etc. flags) is different than a number of flags indicating whether the residual value of the residual values is greater than the threshold value in the TSRC scheme. As another example, a scan order for the residual block in TRCC and TSRC may be different (e.g., TRCC is last-to-first residual value scan order, and TSRC is first-to-last residual value scan order).

Residual generation unit 204 may determine residual information (e.g., residual values) based on a difference between a block that is to be coded with transform skip and a prediction block. Mode selection unit 202 may determine a type of coding scheme to apply to the residual information (e.g., the type of coding scheme is one of TRCC or TSRC). Entropy encoding unit 220 may encode the residual information based on the determined type of coding scheme. Entropy encoding unit 220 may also signal, into a video bitstream, one or more syntax elements (e.g., sh_is_residual_coding_disabled_flag) indicative of the type of coding scheme. In some examples, entropy encoding unit 220 may signal the one or more syntax elements based on a quantization parameter (QP) of quantization unit 208 being less than or equal to a threshold value (e.g., 4).

As another example, residual generation unit 204 may determine residual information based on a difference between a block that is to be coded with transform skip and a prediction block. Entropy encoding unit 220 may encode the residual information based on a TRCC scheme with skipping of coding of a last nonzero position. Entropy encoding unit 220 may signal the encoded residual information. In some examples, entropy encoding unit 220 may perform its operations on a rotated version of the residual information. Also, in some examples, entropy encoding unit 220 may avoid signaling (e.g., not signal) information that the TRCC scheme is utilized.

Although the above example techniques are described with respect to entropy encoding unit 220, the example techniques should not be considered so limiting. In some examples, mode selection unit 202, or entropy encoding unit 220 in combination with mode selection unit 202, may be configured to perform the example techniques. Moreover, in some examples, various combination of units of video encoder 200 may be configured to perform the example techniques. In general, video encoder 200 may be configured to perform the example techniques described in this disclosure.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 4:
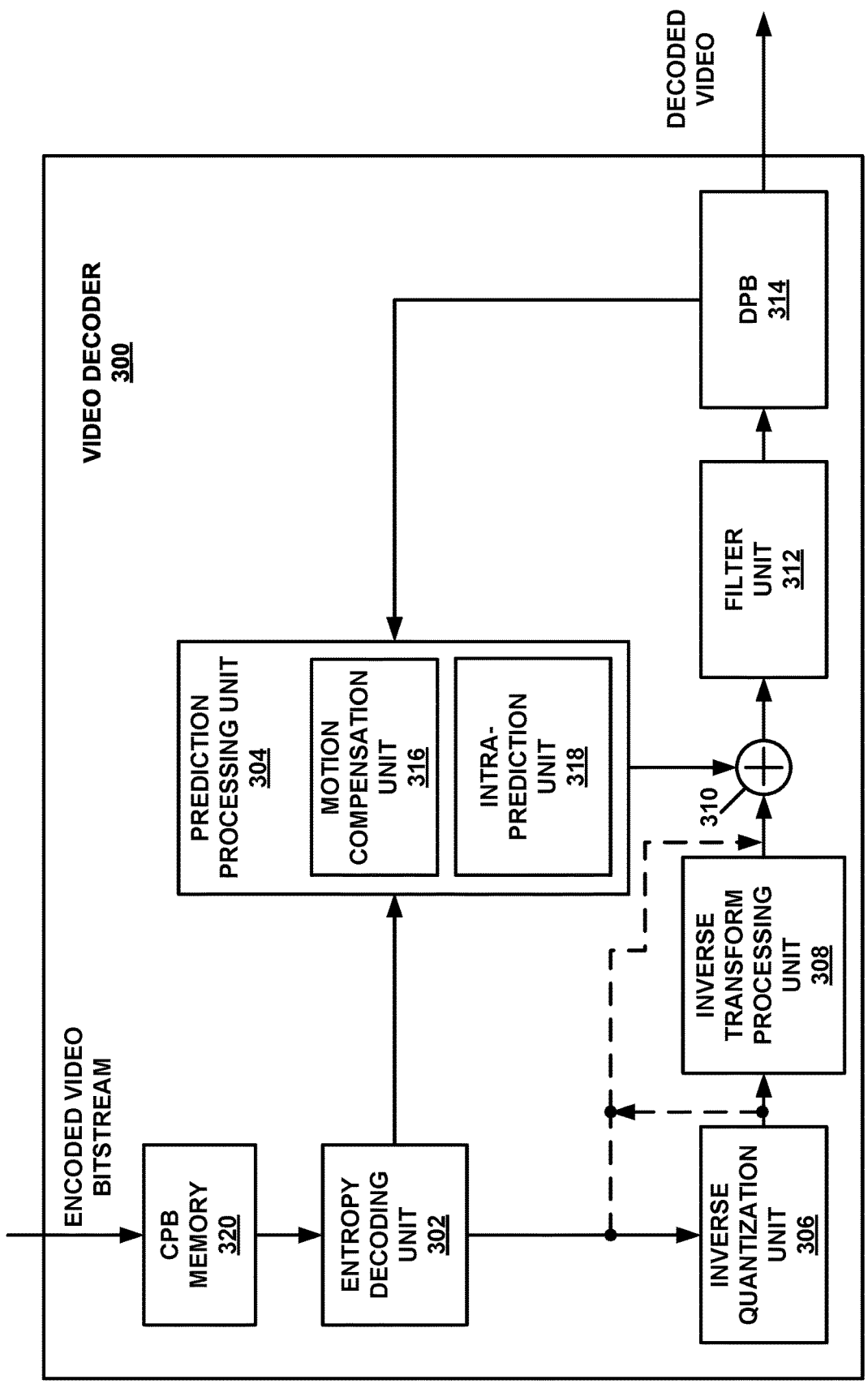
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

As illustrated in FIG. 4 with dashed lines, in some examples, one or both of inverse quantization unit 306 and inverse transform processing unit 308 may be bypassed. For instance, prediction processing unit 304 may receive information that a block is coded in transform skip mode. Prediction processing unit 304 may then cause the operations for inverse transform processing unit 308 to be bypassed, and, in some examples, the operations for inverse quantization unit 306 to be bypassed.

In one or more examples, prediction processing unit 304 may receive one or more syntax elements (e.g., sh_ts_residual_coding_disabled_flag in a slice header) indicative of a type of coding scheme (e.g., the type of coding scheme may be one of a TRCC scheme or a TSRC scheme) applied to residual information of a block coded with transform skip. As described above, there may be various differences between TRCC and TSRC. As one example, in the TRCC scheme, information indicative of a position of a last significant value is parsed. In the TSRC scheme, information indicative of the position of the last significant value is not parsed. In the TRCC scheme, a number of flags indicating whether a residual value of the residual values is greater than a threshold value (e.g., greater than 1, greater than 3, etc. flags) is different than a number of flags indicating whether the residual value of the residual values is greater than the threshold value in the TSRC scheme. As another example, a scan order for the residual block in TRCC and TSRC may be different (e.g., TRCC is last-to-first residual value scan order, and TSRC is first-to-last residual value scan order).

The residual values are indicative of a difference between the block and a prediction block. Prediction processing unit 304 may determine the residual values based on the type of coding scheme. In some examples, prediction processing unit 304 may receive the one or more syntax elements based on a quantization parameter (QP) being less than or equal to a threshold value (e.g., 4).

As another example, prediction processing unit 304 may determine residual information for a block coded with transform skip, where determining the residual information includes determining the residual information utilizing a transform coefficient coding (TRCC) scheme with skipping of coding of a last nonzero position. In some examples, prediction processing unit 304 may rotate the determined residual information prior to reconstructing the block. Prediction processing unit 304 may determine the residual information utilizing the TRCC scheme without receiving information that the TRCC scheme is to be utilized.

Although the above example techniques are described with respect to prediction processing unit 304, the example techniques should not be considered so limiting. In some examples, entropy decoding unit 302, or entropy decoding unit 302 in combination with prediction processing unit 304, may be configured to perform the example techniques. Moreover, in some examples, various combination of units of video decoder 300 may be configured to perform the example techniques. In general, video decoder 300 may be configured to perform the example techniques described in this disclosure.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1. For example, display device 118 may display a picture that includes the reconstructed block.

Figure 5:
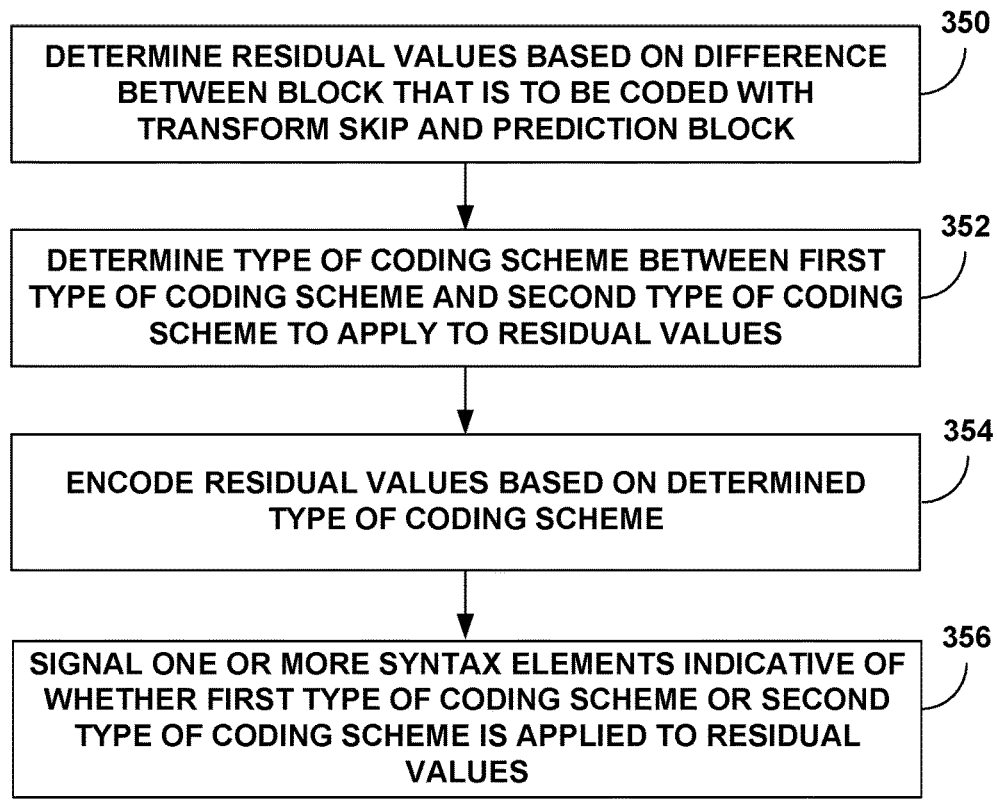
FIG. 5 is a flowchart illustrating an example method for encoding a current block.

FIG. 5 is a flowchart illustrating an example method for encoding a current block. The current block may comprise a current CU. Although described with respect to processing circuitry of video encoder 200 (FIGS. 1 and 3), it should be understood that other devices may be configured to perform a method similar to that of FIG. 5.

Processing circuitry of video encoder 200 may determine residual values based on a different between a block that is to be coded with transform skip and a prediction block (350). In transform skip, the residual values are not transformed from sample domain to frequency domain. For example, the operations of transform processing unit 206 may be bypassed.

Processing circuitry of video encoder 200 may determine a type of coding scheme between a first type of coding scheme and a second type of coding scheme to apply to the residual values (352). As one example, the first type of coding scheme is a transform coefficient coding (TRCC) scheme, and the second type of coding scheme is transform skip residual coding (TSRC) scheme. Video encoder 200 may determine the type of coding scheme based on rate-distortion analysis that indicates which coding scheme provides good video quality balanced with video compression.

In the TRCC scheme, information indicative of a position of a last significant value is signaled, but in the TSRC scheme, information indicative of the position of the last significant value is not signaled. In the TRCC scheme, a number of flags indicating whether a residual value of the residual values is greater than a threshold value (e.g., greater than 1, greater than 3, etc. flags) is different than a number of flags indicating whether the residual value of the residual values is greater than the threshold value in the TSRC scheme. A scan order for the residual block in TRCC and TSRC may be different (e.g., TRCC is last-to-first residual value scan order, and TSRC is first-to-last residual value scan order). The above are some example ways in which TRCC and TSRC are different coding schemes, and example ways should not be considered exhaustive or required in all cases.

The processing circuitry of video encoder 200 may encode the residual values based on the determined type of coding scheme (354). For example, if TSRC is the determined type of coding scheme, then the processing circuitry may not signal a position of a last significant value, may signal greater than threshold flags in accordance with TSRC, and may scan first-to-last. If TRCC is the determined type of coding scheme, then the processing circuitry may signal a position of a last significant value, may signal greater than threshold flags in accordance with TRCC, and may scan last-to-first.

The processing circuitry of video encoder 200 may signal, into a video bitstream, one or more syntax elements indicative of whether the first type of coding scheme or the second type of coding scheme is applied to the residual values (356). For example, the processing circuitry may signal sh_ts_residual_coding_disabled_flag in the slice header to indicate whether TRCC or TSRC scheme is applied to the residual values.

Figure 6:
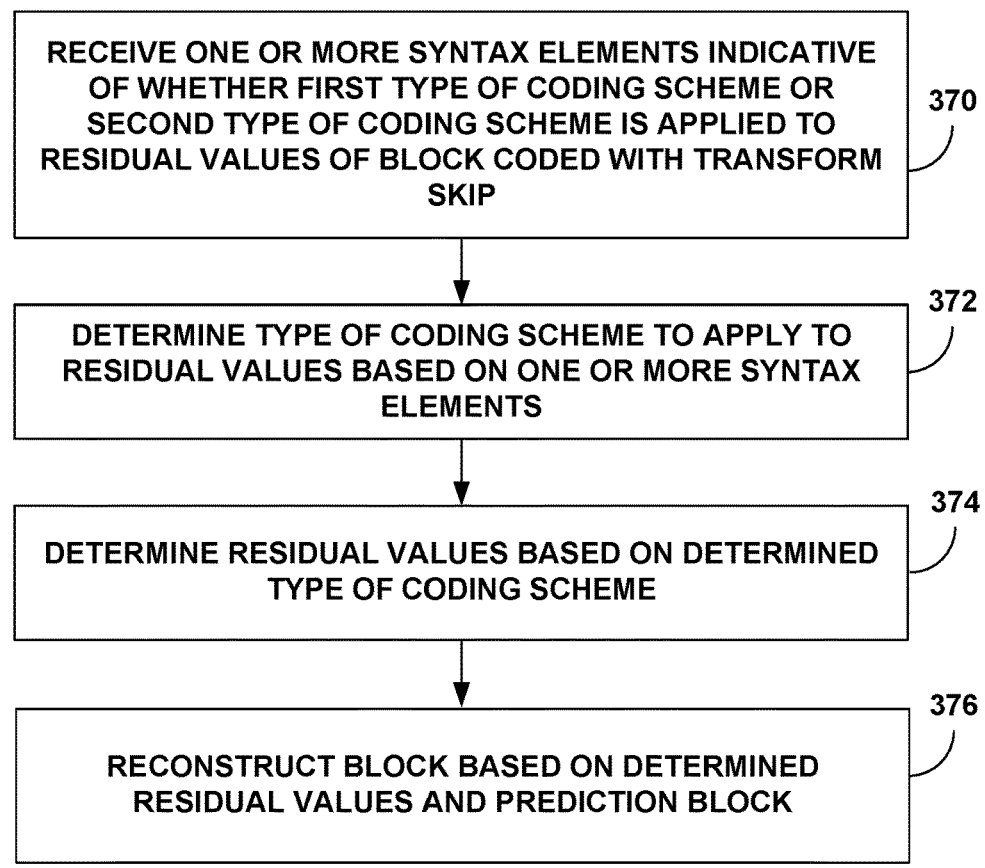
FIG. 6 is a flowchart illustrating an example method for decoding a current block of video data.

FIG. 6 is a flowchart illustrating an example method for decoding a current block. The current block may comprise a current CU. Although described with respect to processing circuitry of video decoder 300 (FIGS. 1 and 4), it should be understood that other devices may be configured to perform a method similar to that of FIG. 6.

Processing circuitry of video decoder 300 may receive, from a video bitstream, one or more syntax elements of the video data indicative of whether a first type of coding scheme or a second type of coding scheme is applied to residual values of a block coded with transform skip (370). The residual values are indicative of a difference between the block and a prediction block, and in transform skip, the residual values are not transformed from sample domain to frequency domain. That is, the residual values are already in the sample domain.

As one example, to receive the one or more syntax elements, the processing circuitry of video decoder 300 may receive a flag in a slice header (e.g., sh_is_residual_coding_disabled_flag) indicating whether the first type of coding scheme or the second type of coding scheme is applied to the residual values of the block coded with transform skip. In some examples, the processing circuitry of video decoder 300 may receive a first flag indicating whether transform skip is enabled (e.g., sps_transform_skip_enabled_flag). To receive the one or more syntax elements, the processing circuitry of video decoder 300 may parse a second flag in a slice header (e.g., sh_ts_residual_coding_disabled_flag) indicating whether the first type of coding scheme or the second type of coding scheme is applied based on the first flag indicating that transform skip is enabled.

In some examples, the first type of coding scheme is a transform coefficient coding (TRCC) scheme, and the second type of coding scheme is transform skip residual coding (TSRC) scheme. In the TRCC scheme, information indicative of a position of a last significant value is parsed, but in the TSRC scheme, information indicative of the position of the last significant value is not parsed. In the TRCC scheme, a number of flags indicating whether a residual value of the residual values is greater than a threshold value (e.g., greater than 1, greater than 3, etc. flags) is different than a number of flags indicating whether the residual value of the residual values is greater than the threshold value in the TSRC scheme. A scan order for the residual block in TRCC and TSRC may be different (e.g., TRCC is last-to-first residual value scan order, and TSRC is first-to-last residual value scan order).

The processing circuitry of video decoder 300 may determine a type of coding scheme to apply to the residual values based on the one or more syntax elements (372). For example, if sh_ts_residual_coding_disabled_flag is true, the processing circuitry of video decoder 300 may determine that TRCC is enabled. If sh_ts_residual_coding_disabled_flag is false, the processing circuitry of video decoder 300 may determine that TSRC is enabled.

The processing circuitry of video decoder 300 may determine the residual values based on the determined type of coding scheme (374). For example, if TSRC is the determined type of coding scheme, then the processing circuitry may not parse a position of a last significant value, may parse greater than threshold flags in accordance with TSRC, and may scan first-to-last. If TRCC is the determined type of coding scheme, then the processing circuitry may parse a position of a last significant value, may parse greater than threshold flags in accordance with TRCC, and may scan last-to-first. Also, because the block is coded in transform skip, to determine the residual values, the processing circuitry of video decoder 300 may determine the residual values without applying an inverse transform to the residual values.

The processing circuitry of video decoder 300 may reconstruct the block based on the determined residual values and the prediction block (376). The processing circuitry of video decoder 300 may add the residual values to the prediction block to reconstruct the block.

The following are one or more example techniques that may be performed separately or in combination.

Example 1. A method of decoding video data, the method comprising receiving one or more syntax elements indicative of a type of coding scheme applied to residual information of a block coded with transform skip, wherein the residual information is indicative of a difference between the block and a prediction block, determining the residual information based on the type of coding scheme, and reconstructing the block based on the determined residual information and the prediction block.

Example 2. A method of encoding video data, the method comprising determining residual information based on a difference between a block that is to be coded with transform skip and a prediction block, determining a type of coding scheme to apply to the residual information, encoding the residual information based on the determined type of coding scheme, and signaling one or more syntax elements indicative of the type of coding scheme.

Example 3. The method of any of examples 1 and 2, wherein the type of coding scheme comprises one of a transform coefficient coding (TRCC) scheme or transform skip residual coding (TSRC).

Example 4. The method of any of examples 1-3, wherein determining the residual information comprises determining the residual information without applying a transform or inverse transform to the residual information.

Example 5. The method of any of examples 1, 3, and 4, wherein receiving the one or more syntax elements comprises receiving the one or more syntax elements based on a quantization parameter (QP) being less than or equal to a threshold value.

Example 6. The method of any of examples 2-4, wherein signaling the one or more syntax elements indicative of the type of coding scheme comprises signaling the one or more syntax elements based on a quantization parameter (QP) being less than or equal to a threshold value.

Example 7. The method of any of examples 5 and 6, wherein the threshold value is four.

Example 8. A method of decoding video data, the method comprising determining residual information for a block coded with transform skip, wherein determining the residual information comprises determining the residual information utilizing a transform coefficient coding (TRCC) scheme with skipping of coding of a last nonzero position, and wherein the residual information is indicative of a difference between the block and a prediction block and reconstructing the block based on the residual information and the prediction block.

Example 9. A method of encoding video data, the method comprising determining residual information for a block coded with transform skip, wherein the residual information is indicative of a difference between the block and a prediction block, encoding the residual information based on a transform coefficient coding (TRCC) scheme with skipping of coding of a last nonzero position, and signaling the encoded residual information.

Example 10. The method of example 9, further comprising rotating the determined residual information prior to reconstructing the block.

Example 11. The method of example 9, further comprising rotating the residual information prior to encoding the residual information.

Example 12. The method of any of examples 8 and 9, wherein rotating comprises rotating by 180-degrees.

Example 13. The method of any of examples 8, 10, and 12, wherein determining the residual information utilizing the TRCC scheme comprises determining the residual information utilizing the TRCC scheme without receiving information that the TRCC scheme is to be utilized.

Example 14. The method of any of examples 9, 11, and 12, further comprising avoiding signaling of information that the TRCC scheme is utilized.

Example 15. A method comprising any one or combination of examples 1, 3-5, 7, 8, 10, 12, and 13.

Example 16. A method comprising any one or combination of examples 2-4, 6, 7, 9, 11, 12, and 14.

Example 17. A device for decoding video data, the device comprising a memory configured to store video data and processing circuitry configured to perform the method of example 15.

Example 18. A device for encoding video data, the device comprising a memory configured to store video data and processing circuitry configured to perform the method of example 16.

Example 19. The device of any of examples 17 and 18, further comprising a display configured to display decoded video data.

Example 20. The device of any of examples 17-19, wherein the device comprises one or more of a camera, a computer, a mobile device, a broadcast receiver device, a set-top box, or a wireless communication device.

Example 21. The device of any of examples 17, 19, and 20, wherein the processing circuitry comprises a video decoder.

Example 22. The device of any of examples 18-20, wherein the processing circuitry comprises a video encoder.

Example 23. A computer-readable storage medium having stored thereon instructions that, when executed, cause one or more processors to perform the method of either of examples 15 or 16.

Example 24. A device for coding video data, the device comprising means for performing the method of either of examples 15 or 16.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving, from a video bitstream, a first flag that indicates whether transform skip is enabled;
receiving, from the video bitstream, based on the first flag indicating that transform skip is enabled, a second flag in a slice header of a slice of the video data indicating whether a first type of coding scheme or a second type of coding scheme is applied to residual values of blocks of the slice of the video data that are coded with transform skip, wherein, according to the first type of coding scheme, information indicative of a position of a last significant value is signaled in the video bitstream for blocks of the slice of the video data that are coded with transform skip in which no transform applied to the residual values of the blocks of the slice that are coded with transform skip, and wherein, according to the second type of coding scheme, information indicative of the position of the last significant value is not signaled in the video bitstream for blocks of the slice of the video data that is are coded with transform skip in which no transform applied to the residual values of the blocks of the slice that are coded with transform skip;

determining a type of coding scheme between the first type of coding scheme and the second type of coding scheme based on the second flag;

determining that a block of the video data is coded with transform skip, based in part on the first flag;

determining residual values for the block coded with transform skip based on the determined type of coding scheme, comprising, only if the first type of coding scheme is determined, parsing, from the video bitstream, the information indicative of the position of the last significant value of the residual for the block, wherein the residual values are indicative of a difference between the block and a prediction block; and reconstructing the block based on the determined residual values and the prediction block, wherein, in reconstructing according to transform skip, the determined residual values are not transformed from a sample domain to a frequency domain.

2. The method of claim 1, wherein the first type of coding scheme is a transform coefficient coding (TRCC) scheme, and the second type of coding scheme is a transform skip residual coding (TSRC) scheme, wherein the first scheme and the second scheme including decoding a significance map for the block.

3. The method of claim 2, wherein, in the TRCC scheme, a number of flags that indicate whether a residual value of the residual values is greater than a threshold value is a first value, wherein, in the TSRC scheme, a number of flags that indicate whether the residual value of the residual values is greater than the threshold value is a second value, and wherein the first value is different than the second value.

4. The method of claim 1, wherein determining the residual values comprises determining the residual values without applying an inverse transform to the residual values.

5. The method of claim 1, wherein receiving the second flag comprises receiving the second flag based on a quantization parameter (QP) being less than or equal to a threshold value.

6. A method of encoding video data, the method comprising:

determining that a block of a slice of the video data is to be coded with transform skip;

determining residual values based on a difference between the block of the video data that is to be coded with transform skip and a prediction block;

determining a type of coding scheme between a first type of coding scheme and a second type of coding scheme to apply to the residual values, wherein, according to the first type of coding scheme, information indicative of a position of a last significant value is signaled in a video bitstream for the block, and wherein, according to the second type of coding scheme, information indicative of the position of the last significant value is not signaled in the video bitstream for the block;

encoding the residual values based on the determined type of coding scheme, wherein, in encoding according to transform skip, the residual values are not transformed from a sample domain to a frequency domain and no transform is applied to the residual values;

signaling, into a video bitstream, a first flag that indicates whether transform skip is enabled;

signaling, into the video bitstream, based on whether transform skip is enabled, a second flag in a slice header of the slice indicating whether the first type of coding scheme or the second type of coding scheme is applied to the residual values; and only if the first type of coding scheme is determined for the block coded with transform skip, encoding, into the video bitstream, information indicative of the position of the last significant value of the residual values for the block.

7. The method of claim 6, wherein the first type of coding scheme is a transform coefficient coding (TRCC) scheme, and the second type of coding scheme is a transform skip residual coding (TSRC) scheme wherein the first scheme and the second scheme including decoding a significance map for the block.

8. The method of claim 6, wherein signaling the second flag comprises signaling the second flag based on a quantization parameter (QP) being less than or equal to a threshold value.

9. A device for decoding video data, the device comprising:

memory configured to store video data; and processing circuitry coupled to the memory and configured to:

receive, from a video bitstream, a first flag that indicates whether transform skip is enabled;

receive, from the video bitstream, based on the first flag indicating that transform skip is enabled, a second flag in a slice header of a slice of the video data indicating whether a first type of coding scheme or a second type of coding scheme is applied to residual values of blocks of the slice of the video data that are coded with transform skip, wherein according to the first type of coding scheme, information indicative of a position of a last significant value is signaled in the video bitstream for blocks of the slice of the video data that are coded with transform skip in which no transform applied to the residual values of the blocks of the slice that are coded with transform skip, and wherein, according to the second type of coding scheme, information indicative of the position of the last significant value is not signaled in the video bitstream for blocks of the slice of the video data that is are coded with transform skip in which no transform applied to the residual values of the blocks of the slice that are coded with transform skip;

determine a type of coding scheme between the first type of coding scheme and the second type of coding scheme based on the second flag;

determine that a block of the slice is coded with transform skip, based in part on the first flag;

determine the residual values for the block coded with transform skip based on the determined type of coding scheme, wherein the processing circuitry is further configured to parse, only if the first type of coding scheme is determined, from the video bitstream, the information indicative of the position of the last significant value of the residual, wherein the residual values are indicative of a difference between the block and a prediction block; and reconstruct the block based on the determined residual values and the prediction block, wherein, in reconstructing according to transform skip, the determined residual values are not transformed from a sample domain to a frequency domain.

10. The device of claim 9, wherein the first type of coding scheme is a transform coefficient coding (TRCC) scheme, and the second type of coding scheme is a transform skip residual coding (TSRC) scheme, wherein the first scheme and the second scheme including decoding a significance map for the block.

11. The device of claim 10, wherein, in the TRCC scheme, a number of flags that indicate whether a residual value of the residual values is greater than a threshold value is a first value, wherein, in the TSRC scheme, a number of flags that indicate whether the residual value of the residual values is greater than the threshold value is a second value, and wherein the first value is different than the second value.

12. The device of claim 9, wherein to determine the residual values, the processing circuitry is configured to determine the residual values without applying an inverse transform to the residual values.

13. The device of claim 9, wherein to receive the second flag, the processing circuitry is configured to receive the second flag based on a quantization parameter (QP) being less than or equal to a threshold value.

14. The device of claim 9, further comprising a display configured to display a picture that includes the reconstructed block.

15. The device of claim 9, wherein the device comprises one or more of a camera, a computer, a mobile device, a broadcast receiver device, a set-top box, or a wireless communication device.

16. A non-transitory computer-readable storage medium having stored thereon instructions that, when executed, cause one or more processors to:
receive, from a video bitstream, a first flag that indicates whether transform skip is enabled;
receive, from the video bitstream, based on the first flag indicating that transform skip is enabled, a second flag in a slice header of a slice of video data indicating whether a first type of coding scheme or a second type of coding scheme is applied to residual values of blocks of the slice of the video data that are coded with transform skip, wherein according to the first type of coding scheme, information indicative of a position of a last significant value is signaled in the video bitstream for blocks of the slice of the video data that are coded with transform skip in which no transform applied to the residual values of the blocks of the slice that are coded with transform skip, and wherein, according to the second type of coding scheme, information indicative of the position of the last significant value is not signaled in the video bitstream for blocks of the slice of the video data that is are coded with transform skip in which no transform applied to the residual values of the blocks of the slice that are coded with transform skip;
determine a type of coding scheme between the first type of coding scheme and the second type of coding scheme based on the second flag;
determine that a block of the slice is coded with transform skip, based in part on the first flag;
determine the residual values for the block coded with transform skip based on the determined type of coding scheme, wherein the instructions further cause the processors to parse, only if the first type of coding scheme is determined, from the video bitstream, the information indicative of the position of the last significant value of the residual, wherein the residual values are indicative of a difference between the block and a prediction block; and
reconstruct the block based on the determined residual values and the prediction block, wherein, in reconstructing according to transform skip, the residual values are not transformed from a sample domain to a frequency domain.

17. A device for decoding video data, the device comprising:
means for receiving, from a video bitstream, a first flag that indicates whether transform skip is enabled;
means for receiving, based on the first flag indicating that transform skip is enabled, a second flag in a slice header of a slice of the video data indicating whether a first type of coding scheme or a second type of coding scheme is applied to residual values of blocks of the slice of the video data that are coded with transform skip, wherein, according to the first type of coding scheme, information indicative of a position of a last significant value is signaled in the video bitstream for blocks of the slice of the video data that are coded with transform skip in which no transform applied to the residual values of the blocks of the slice that are coded with transform skip, and wherein, according to the second type of coding scheme, information indicative of the position of the last significant value is not signaled in the video bitstream for blocks of the slice of the video data that is are coded with transform skip in which no transform applied to the residual values of the blocks of the slice that are coded with transform skip;
means for determining a type of coding scheme between the first type of coding scheme and the second type of coding scheme based on the second flag;
means for determining that a block of the slice is coded with transform skip, based in part on the first flag;
means for determining the residual values for the block coded with transform skip based on the determined type of coding scheme comprising means for parsing, only if the first type of coding scheme is determined, from the video bitstream, the information indicative of the position of the last significant value of the residual for the block, wherein the residual values are indicative of a difference between the block and a prediction block; and
means for reconstructing the block based on the determined residual values and the prediction block, wherein, in reconstructing according to transform skip, the determined residual values are not transformed from a sample domain to a frequency domain.

18. The method of claim 1, further comprising:
receiving, from the video bitstream and based in part on the first flag, a third flag, the third flag being a block level flag and indicative of whether the block of the video data is coded with transform skip,
wherein determining that the block of the video data is coded with transform skip comprises determining that the block of the video data is coded with transform skip based on the third flag.

19. The device of claim 9,
wherein the processing circuitry is configured to receive, from the video bitstream and based in part on the first flag, a third flag, the third flag being a block level flag and indicative of whether the block of the video data is coded with transform skip, and
wherein to determine that the block of the video data is coded with transform skip, the processing circuitry is configured to determine that the block of the video data is coded with transform skip based on the third flag.

* * * * *